P. BALZANO.
CUE SHAVE.
APPLICATION FILED FEB. 14, 1913.
1,079,687.
Patented Nov. 25, 1913.
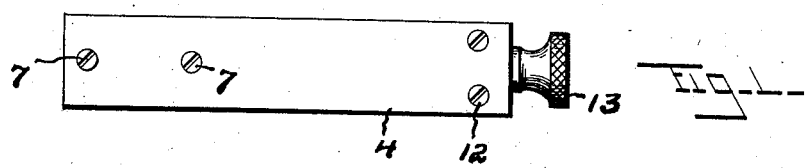
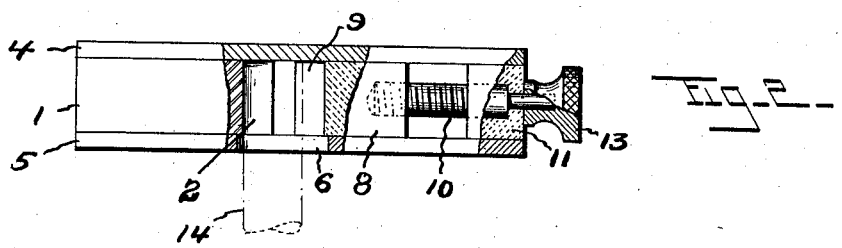
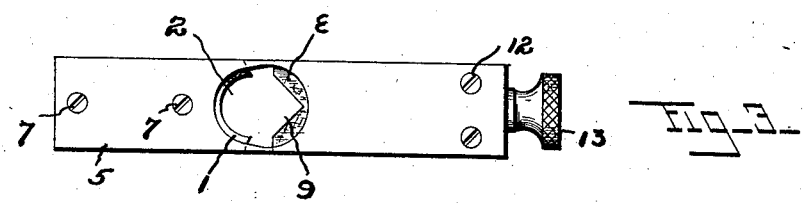
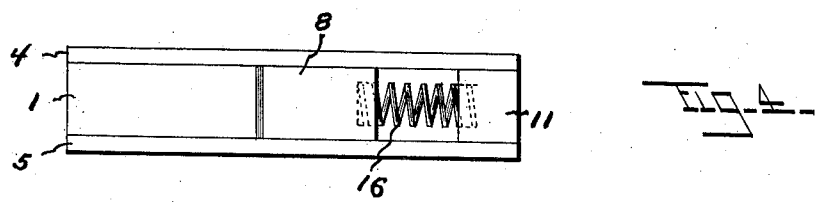
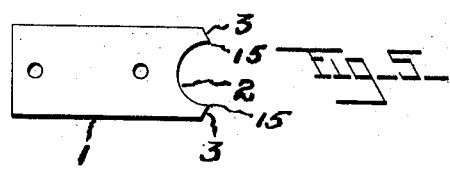
WITNESSES:
Florence H. Monk
Wallace S. Moyle
INVENTOR
Peter Balzano
BY
ATTORNEY

UNITED STATES PATENT OFFICE.

PETER BALZANO, OF NEW HAVEN, CONNECTICUT.

CUE-SHAVE.

1,079,687.   Specification of Letters Patent.   Patented Nov. 25, 1913.

Application filed February 14, 1913. Serial No. 748,369.

*To all whom it may concern:*

Be it known that I, PETER BALZANO, a subject of Victor Immanuel III, King of Italy, residing at New Haven, in the county of New Haven and State of Connecticut, have invented certain new and useful Improvements in Cue-Shaves, of which the following is a specification, reference being had therein to the accompanying drawings.

My invention relates to a cue shave, having for its object, among other things, to provide a simple and economical device that may be used to shave the outer end of a cue and bring it to the proper diameter for insertion within the ferrule.

To these, and other ends, my invention consists in the cue shave, having certain details of construction, and combinations of parts, as will be hereinafter described and more particularly pointed out in the claims.

Referring to the drawings, in which like numerals of reference designate like parts in the several figures; Figure 1 is a plan view of my improved device; Fig. 2 is a side elevation thereof, partly in section; Fig. 3 is a view of the underside thereof; Fig. 4 is a view of modified form of my invention; and Fig. 5 is a detailed view of the cutter.

In the practice of my invention, I provide a cutter 1, having a semi-circular recess 2 in one end thereof, which is of substantially the same diameter as the finished end of the cue when ready to be inserted within the ferrule, the ends 3 thereof being beveled so as to form the cutting edges 15. This cutter is secured between the plates 4 and 5 by the screws 7, or by any other preferred means. The plate 4 is solid and the plate 5 has an opening 6 therein substantially concentric with the recess 2. Between said plates is a pressure block 8, having a V notch 9 in the end thereof opposite the recess 2, this block being moved toward and away from the cutter 1 by a screw 10, having a thumb button 13 thereon, that is threaded into said block and rotatably mounted in the head block 11 secured between the plates 4 and 5 by the screw 12.

In operation, the cue is placed through the opening 6 and lies between the cutter block 1 and pressure block 8 with its end abutting against the plate 4, as shown in Fig. 2, wherein said cue is represented by the broken lines 14. The tool is now rotated about the end of the cue, or the cue within the tool, as desired, and the pressure block 8 exerts a slight pressure thereon, so that one of the cutting edges 15 shaves off the outside of the cue, until it has been reduced to substantially the same diameter as the recess 2, at which time the ends of the pressure block will contact with the cutting edges 15 and prevent further cutting action thereof. A spring 16 may be substituted for the screw 10 so that a constant pressure may be exerted upon the block 8.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In a cue shave, the combination with a fixed cutter, having a semi-circular recess therein, of the same diameter as that of the shaved cue, that terminates in cutting edges at both ends thereof and upon opposite sides of the center; of a plate upon each side of and abutting against said cutter, one of said plates having an opening therethrough; a pressure block movable between said plates, and having a notch therein opposite and parallel with said recess, the end of said pressure block in one of its positions abutting against both of the cutting edges of said cutter, at which time the cutter ceases to cut and the cue in the shave contacts with the said notch and said semi-circular recess with its end against the inside of one of the said side plates; and means for moving said pressure block toward and away from said cutter.

2. In a cue shave, the combination with a fixed cutter, having a semi-circular recess therein, of the same diameter as that of the shaved cue and provided with cutting edges that will engage and cut the cue irrespective of the direction that it may be rotated in relation thereto; of a plate upon each side of and abutting against said cutter, one of said plates having an opening therethrough; a pressure block movable between said plates, and having a notch therein opposite and parallel with said recess, the end of said pressure block in one of its positions abutting against the cutting edges of said cutter, at which time the cutter ceases to cut; and means for moving said pressure block toward and away from said cutter.

In testimony whereof I affix my signature in presence of two witnesses.

PETER BALZANO.

Witnesses:
 GEORGE E. HALL,
 FLORENCE H. MONK.

Copies of this patent may be obtained for five cents each, by addressing the "Commissioner of Patents, Washington, D. C."